United States Patent
Sharma et al.

(10) Patent No.: US 10,659,528 B2
(45) Date of Patent: May 19, 2020

(54) CLOUD ENABLED COGNITIVE RADIO ADHOC VEHICULAR NETWORKING WITH SECURITY AWARE RESOURCE MANAGEMENT AND INTERNET OF VEHICLES APPLICATIONS

(71) Applicant: BOARD OF TRUSTEES OF THE UNIVERSITY OF ARKANSAS, Little Rock, AR (US)

(72) Inventors: Sachin Sharma, Little Rock, AR (US); Muhammad Awan, Little Rock, AR (US); Seshadri Mohan, Little Rock, AR (US)

(73) Assignee: BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 2 days.

(21) Appl. No.: 16/058,488

(22) Filed: Aug. 8, 2018

(65) Prior Publication Data

US 2018/0352027 A1 Dec. 6, 2018

Related U.S. Application Data

(63) Continuation-in-part of application No. 15/705,542, filed on Sep. 15, 2017, now abandoned.
(Continued)

(51) Int. Cl.
*H04W 4/00* (2018.01)
*H04L 29/08* (2006.01)
(Continued)

(52) U.S. Cl.
CPC ........ *H04L 67/1076* (2013.01); *G08G 1/0112* (2013.01); *G08G 1/0133* (2013.01);
(Continued)

(58) Field of Classification Search
CPC ........... H04W 72/042; H04W 72/0446; H04W 76/27; H04L 5/0048; H04L 5/0053
See application file for complete search history.

(56) References Cited

U.S. PATENT DOCUMENTS 7,876,786 B2 * 1/2011 Bahl ..................... H04L 5/0032
370/344
9,674,880 B1 * 6/2017 Egner ................... H04W 4/029
(Continued)

*Primary Examiner* — Atique Ahmed
(74) *Attorney, Agent, or Firm* — Locke Lord LLP; Tim Tingkang Xia, Esq.

(57) ABSTRACT

A vehicular hybrid network system includes a cognitive radio ad hoc vehicular network (CRAVENET) configured to provide information services to a plurality of vehicles in the CRAVENET. The CRAVENET includes a first plurality of cloud networks interconnecting a set of vehicles from the plurality of vehicles. The set of vehicles shares a set of resources. The CRAVENET further includes a second plurality of cloud networks interconnecting two or more of the first plurality of cloud networks using a short-range communication system. The CRAVENET also includes one or more central cloud network interconnecting the second plurality of cloud networks using a long-range communication system. The vehicular hybrid network system further includes an IoV application management system configured to control the set of resources available to the CRAVENET and a CRAVENET communication system configured to provide distributive communication to the sets of vehicles via a secure communication protocol.

16 Claims, 5 Drawing Sheets

Related U.S. Application Data

(60) Provisional application No. 62/543,574, filed on Aug. 10, 2017, provisional application No. 62/398,811, filed on Sep. 23, 2016.

(51) Int. Cl.

| | | |
|---|---|---|
| *H04W 4/46* | (2018.01) | |
| *H04W 84/18* | (2009.01) | |
| *H04W 48/02* | (2009.01) | |
| *H04W 60/04* | (2009.01) | |
| *H04W 12/08* | (2009.01) | |
| *G08G 1/0967* | (2006.01) | |
| *G08G 1/0968* | (2006.01) | |
| *G08G 1/00* | (2006.01) | |
| *G08G 1/01* | (2006.01) | |
| *H04W 12/10* | (2009.01) | |
| *G08G 1/09* | (2006.01) | |
| *H04W 12/12* | (2009.01) | |
| *H04L 29/06* | (2006.01) | |
| *G06N 20/00* | (2019.01) | |
| *G06N 5/04* | (2006.01) | |
| *G06Q 30/02* | (2012.01) | |

(52) U.S. Cl.
CPC ....... *G08G 1/091* (2013.01); *G08G 1/096716* (2013.01); *G08G 1/096758* (2013.01); *G08G 1/096791* (2013.01); *G08G 1/096816* (2013.01); *G08G 1/096844* (2013.01); *G08G 1/205* (2013.01); *H04L 67/12* (2013.01); *H04W 4/46* (2018.02); *H04W 12/08* (2013.01); *H04W 12/1006* (2019.01); *H04W 12/1008* (2019.01); *H04W 12/1202* (2019.01); *H04W 48/02* (2013.01); *H04W 60/04* (2013.01); *H04W 84/18* (2013.01); *G06N 5/04* (2013.01); *G06N 20/00* (2019.01); *G06Q 30/0207* (2013.01); *H04L 63/0823* (2013.01); *H04L 63/1425* (2013.01); *H04L 63/1466* (2013.01); *H04L 67/34* (2013.01)

(56) References Cited

U.S. PATENT DOCUMENTS

| | | | |
|---|---|---|---|
| 2006/0279654 A1* | 12/2006 | Lee | H04N 19/105 |
| | | | 348/395.1 |
| 2008/0155249 A1 | 6/2008 | Backof et al. | |
| 2013/0231824 A1 | 9/2013 | Wilson et al. | |
| 2016/0139594 A1 | 5/2016 | Okumura et al. | |
| 2017/0155703 A1* | 6/2017 | Hao | H04L 67/12 |
| 2020/0053591 A1* | 2/2020 | Prasad | H04N 21/238 |
| 2020/0057453 A1* | 2/2020 | Laws | B60W 30/188 |

\* cited by examiner

CLOUD ENABLED COGNITIVE RADIO ADHOC VEHICULAR NETWORKING WITH SECURITY AWARE RESOURCE MANAGEMENT AND INTERNET OF VEHICLES APPLICATIONS

CROSS-REFERENCE TO RELATED APPLICATION

This application claims priority to and the benefit of U.S. Provisional Application No. 62/543,574, filed Aug. 10, 2017, which is herein incorporated by reference in its entirety.

This application is also a continuation-in-part of U.S. patent application Ser. No. 15/705,542, filed Sep. 15, 2017, which claims priority to and the benefit of U.S. provisional patent application Ser. No. 62/398,811, filed Sep. 23, 2016, which is herein incorporated by reference in its entirety.

FIELD

The present disclosure relates generally to networking systems, more particularly to Cloud enabled cognitive RAdio adhoc VEhicular NETworking (CRAVENET) with security aware resource management and Internet Of Vehicles (IoV) applications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Recent advances in Intelligent Transportation Systems (ITS) have changed paving the way to the intelligent vehicles. The vehicle that has a driver assistance capability or a highly automated driving capability (e.g., a self-driving vehicle) is now gathering information about the state of the vehicle and the state of the environment and is sharing that information with drivers and other infrastructure. IoV applications are commonly available on vehicles that have a driver assistance capability or a highly automated driving capability (e.g., a self-driving vehicle). The IoV applications have intelligence and learning capabilities to anticipate driver intentions. Thus, integrating cloud computing into CRAVENET allows increasing accessibility to multimedia services, and potential applications for drivers.

Therefore, an unaddressed need exists in the art to address the aforementioned deficiencies and inadequacies. This invention seeks to exploit the cloud-enabled CRAVENET technology to enhance resource management service mechanism.

SUMMARY

In accordance with at least one aspect of this disclosure, a vehicular hybrid network system includes a cognitive radio ad hoc vehicular network (CRAVENET) configured to provide information services to a plurality of vehicles in the CRAVENET. The CRAVENET includes a first plurality of cloud networks. Each of the first plurality of cloud networks interconnects a set of vehicles from the plurality of vehicles. The set of vehicles shares a set of resources associated with a corresponding cloud network. The CRAVENET further includes a second plurality of cloud networks. Each of the second plurality of cloud networks interconnects two or more of the first plurality of cloud networks using a short-range communication system. The CRAVENET also includes one or more central cloud network interconnecting the second plurality of cloud networks using a long-range communication system. The vehicular hybrid network system further includes an IoV application management system configured to control the set of resources available to the CRAVENET and a CRAVENET communication system configured to provide distributive communication to the sets of vehicles via a secure communication protocol.

The first plurality of cloud networks can include a local CRAVENET cloud-based network interconnecting the set of vehicles positioned within a pre-defined range of each other. The second plurality of cloud networks can be configured to provide at least one of system configuration update services, application customization services and shared data storage services.

The central cloud network can be configured to implement one or more global resource utilization policies. The IoV application management system can include at least one of: a client management system configured to provide real-time IoV application connectivity services to the sets of vehicles, a gateway management system configured to provide real-time network access services to the sets of vehicles and a cloud management system configured to provide a plurality of computational and information processing services to the sets of vehicles.

The IoV application management system can be configured to provide one or more IoV applications. The one or more IoV applications can include an intelligent disaster management reinforcement system configured to provide cloud-based secure communication and computational environment to be shared between a plurality of emergency response entities. The one or more IoV applications can include a bandwidth resource sharing application configured to manage network bandwidth between vehicles comprising the set of vehicles based on vehicles' network bandwidth requirements.

The CRAVENET communication system can support at least: CR broadcast mode that provides connectionless information exchange between the set of vehicles and a CR bilateral mode that provides a full duplex connection between the set of the vehicles. Each vehicle in the set of vehicles can be equipped with or can be communicatively coupled with a plurality of sensors configured to obtain vehicle-related information and configured to transmit the obtained vehicle-related information to the CRAVENET. The intelligent disaster management reinforcement system can be configured to communicate with one or more building systems.

In certain embodiments, the local CRAVENET cloud-based network can be configured to allocate shared resources to the set of vehicles using a demand side resource management mode. The one or more IoV applications can include a video sharing application configured to manage high definition video monitoring, storage and sharing. The one or more IoV applications can include a Unique Vehicle Identity (UVI) application configured to generate vehicle's UVI information indicative of vehicle's geographic position.

In certain embodiments, each of the second plurality of cloud networks can interconnect two or more of the first plurality of cloud networks using a dedicated short-range communications infrastructure.

The one or more central cloud networks can interconnect the second plurality of cloud networks using radio frequency communications in ultra high frequency (UHF) range.

In accordance with at least one aspect of this disclosure, a method for efficiently registering a vehicle with a CRA-VENET includes receiving vehicle's certified signature information indicative of registering vehicle's identity, determining if the received registering vehicle's certified signature information matches previously stored vehicle certified signature information, and generating one or more security alarms responsive to a determination that the received vehicle's certified signature information does not match previously stored vehicle certified signature information. The method can include providing temporary access to the set of resources associated with the CRAVENET to the registering vehicle.

In accordance with at least one aspect of this disclosure, a method for providing secure communications to a set of vehicles within a CRAVENET includes performing authentication of a vehicle transmitting a packet of data, comparing the packet of data received from the vehicle with one or more packets transmitted by other vehicles located in the same vicinity to determine whether the transmitted packet is malicious, and discarding the packet of data responsive to a determination that the transmitted packet is malicious. The method can also include determining transmission mode associated with the transmitted packet prior to comparing the packet.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment.

DETAILED DESCRIPTION

Figure 1:
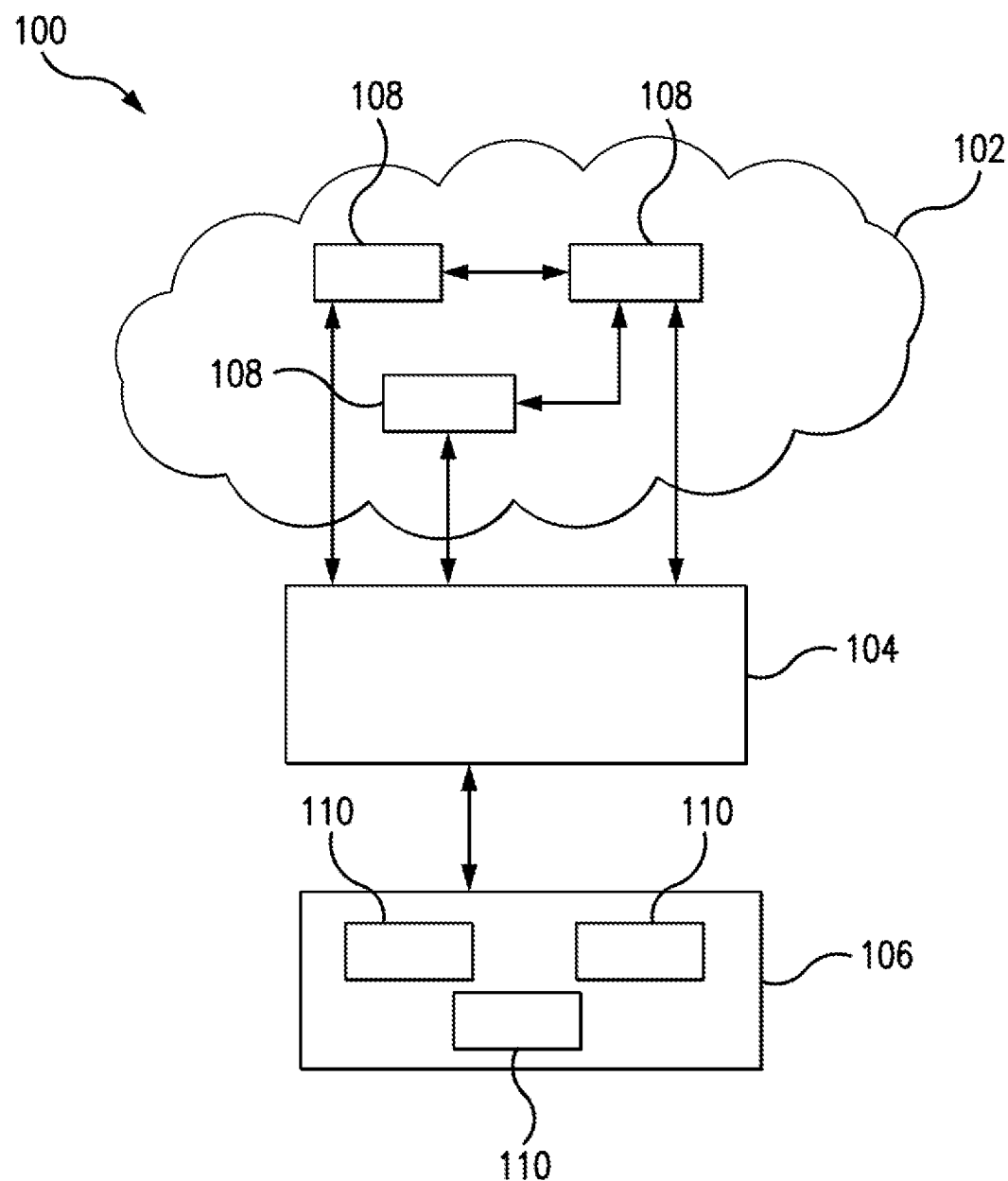
FIG. 1 shows a schematic diagram of an embodiment of a vehicular hybrid network system in accordance with this disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

This varied, interrelated subject matter does not lend itself to a straightforward presentation. Thus, the reader's indulgence is solicited as this narrative occasionally proceeds in nonlinear fashion among the assorted topics and technologies.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The terms "routine" and "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be a uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure in one aspect relates to vehicular hybrid network systems. One of ordinary skill in the art would appreciate that, unless otherwise indicated, certain computer systems and/or components thereof may be implemented in, but not limited to, the forms of software, firmware or hardware components, or a combination thereof.

The apparatuses, systems, and/or methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In accordance with the purposes of present disclosure, as embodied and broadly described herein, in certain aspects, the present disclosure relates to networking systems (e.g., cognitive radio networks), more particularly to smart vehicular hybrid network systems and methods. Disclosed herein, in at least some embodiments, are methods, systems, and apparatuses that provide to the vehicles in the CRAVENET better computation speed, bandwidth resource sharing and multiple IoV applications. The cloud-enabled CRAVENET incorporates the connection among the cloud computing devices and CRAVENET. Embodiments include a method enabling the vehicles in the CRAVENET to share network resources and share wider scope network information for decision making purposes.

By defining suitable utility functions, the disclosed architecture facilitates contextually-aware resource management in real time. Also disclosed are embodiments of cloud-enabled IoV applications to the CRAVENET enabled vehicles. A hybrid system which comprises the CRAVENET, IoV application management system and a CRAVENET communication system utilizing a secure communication protocol is disclosed. While CRAVENET is described for use in inter-vehicular communication, e.g., in backend sharing the local area information which can include local businesses, geo information, traffic information etc., any suitable application is contemplated herein. CRAVENET can use a distributive and comparative methodology for secure communication purposes. In certain embodiments, the cloud-enabled CRAVENET environment can be used for real-time access of a plurality of IoV applications.

Since autonomous vehicles have been the center of attention to exploit the new dimensions in the auto industry, several smart vehicles have been introduced by different manufacturers. Some potential applications using existing technologies to introduce intelligence in an autonomous vehicle are disclosed herein. Embodiments herein are not limited to autonomous vehicles only.

The next generation vehicles are being designed and under research, several experiments have been conducted to put as much intelligence in a vehicle to make them autonomous. The autonomous vehicles are capable of accessing IoV applications. Many emerging IoV applications require large bandwidth, secure storage, complex computational platform, and enhanced resource management. For example, emerging IoV applications may require real-time video sharing services, dynamic accumulated bandwidth requirement sharing services, social media sharing and other multimedia services provided by a plurality of media sources.

CRAVENET is configured to assess road traffic conditions in various ways based on obtained real-time road traffic related data, such as data samples from vehicles and other mobile data sources traveling on the roads, driver behavior data and road condition data obtained from a plurality of sources (such as physical sensors near to or embedded in the roads). In various embodiments, such assessment may be a key factor in improving transport safety and performance, as well as improving driver safety, achieving traffic congestion relief, and maximizing driver's comfort. Embodiments of CRAVENET can collect real time road traffic related data and bandwidth utilization rate information and transmit to the data center for processing, and in return, that information could be broadcasted to the drivers for safe route optimization purposes, for example.

As noted above, the autonomous vehicles are capable of accessing IoV applications. IoV is an imminent merging of the vehicle system with the Internet of Things (IoT). CRAVENET supports integrated intelligent vehicles capable of two-way wireless communications. CRAVENET is an emerging technology that can obtain driving data from multiple vehicles that may be collected by vehicle sensors or other vehicle-based systems, transmit the obtained data using vehicle-to-vehicle (V2V) secure communications, and can analyze and compare the obtained data to determine various driving behaviors by the drivers of the vehicles, for example.

The autonomous vehicles are equipped with several sensors to detect the surroundings to avoid accidents and to follow the given path. The vehicle sensors gather information like GPS location, vehicle health conditions, road side businesses, driver behavior and road conditions, etc. and upload into their cloud enabled CRAVENET. A vehicle's performance is always a concern whether it is autonomous or driver dependent. The users are also concerned about the surroundings they are passing through. Embodiments can optimize the performance of vehicle and optimize driver safety in the case of autonomous cars and can also help travelers to reach their destinations in a safe manner.

The CRAVENET provides a promising approach to facilitate traffic management and road safety management by allowing efficient participation of the autonomous vehicles in maintaining smooth traffic flow. One of the requirements of this network may be to ensure secure communication between participants, safeguard private information, and facilitate high volume data exchange. With a suitable multi-applications suite, embodiments of CRAVENET allow network operators to manage multiple vehicles bandwidth requirements in an efficient manner as well.

FIG. 1 shows a schematic diagram of an embodiment of a system in accordance with this disclosure. As shown, FIG. 1 illustrates an exemplary vehicular hybrid network system 100. The vehicular hybrid network system consists of CRAVENET 102 interconnected with an IoV application management system 106 by a CRAVENET communication system 104. The CRAVENET 102 is configured to provide information services to a plurality of vehicles 108. According to embodiments of the present invention, the CRAVENET 102 may include a plurality of cloud networks as described below. The IoV application management system 106 is configured to control the set of resources available to the CRAVENET 102. The CRAVENET communication system 104 is configured to provide distributive communication to the sets of vehicles via a secure communication protocol described below.

Embodiments and/or any suitable portions thereof of the hybrid network system 100 shown in FIG. 1 can be implemented using any suitable computer hardware and/or software as appreciated by those having ordinary skill in the art.

Figure 2:
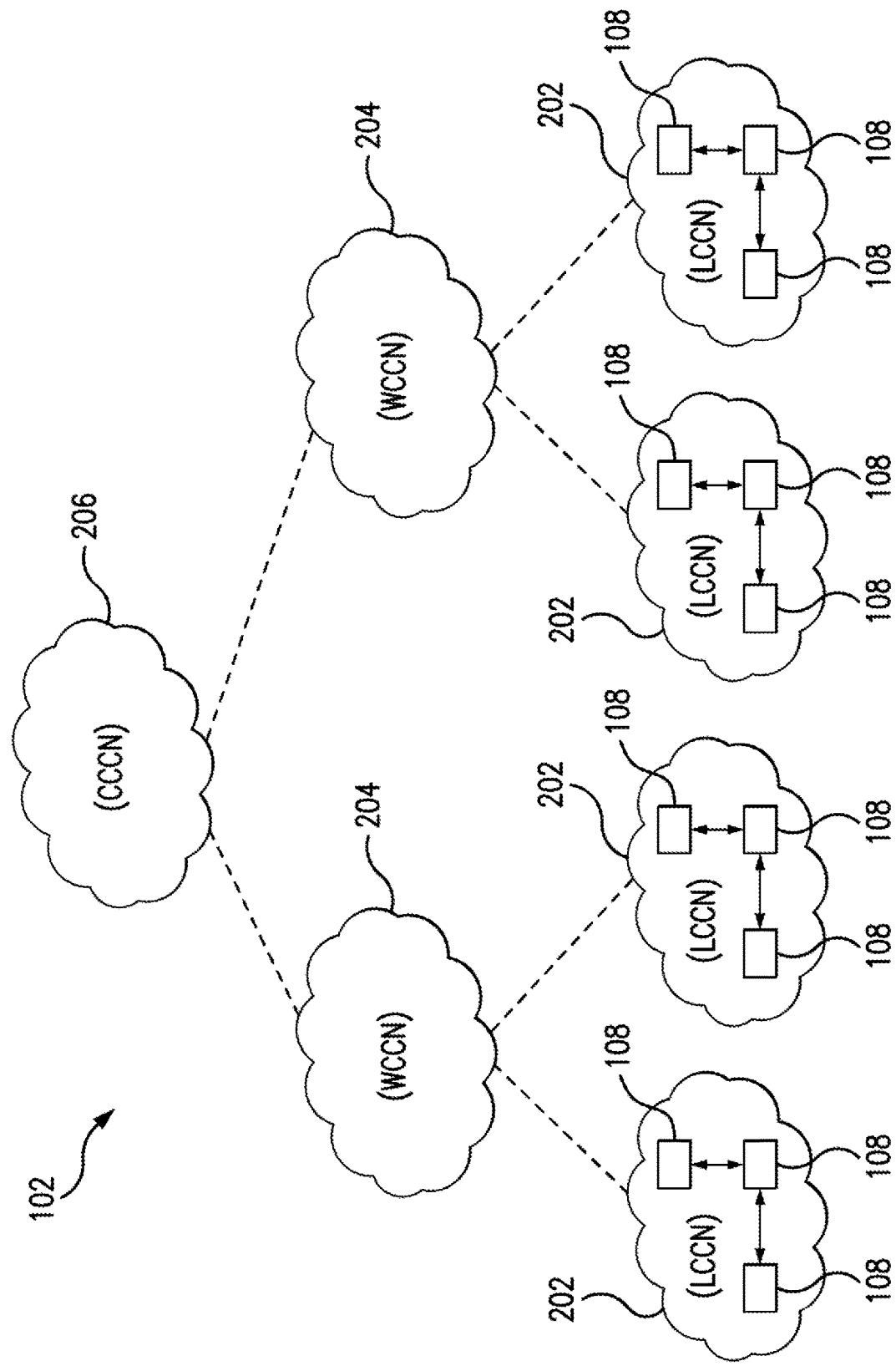
FIG. 2 shows an embodiment of CRAVENET architecture in accordance with this disclosure.

FIG. 2 shows an embodiment of CRAVENET architecture in accordance with this disclosure. Cloud enabled CRAVENET 102 architecture plays a vital role in enabling Internet access to a plurality of devices on an on-demand basis. CRAVENET 102 is particularly attractive in providing global enterprise connectivity. CRAVENET 102 is a single point of access for all the computing needs of a plurality of vehicles. According to one aspect disclosed herein, the CRAVENET 102 architecture may provide a plurality of services, such as, but not limited to Software as a Service (SaaS), Hardware as a Service (HaaS), and Data as a Service (DaaS) or together as Platform as a Service (PaaS). As noted above, the CRAVENET 102 provides more efficient approach for gathering, processing, accessing and sharing information in one or more vehicles 108 using V2V communication, as compared to more traditional methods of traffic information collection using, for example, on-board vehicle devices, traffic cameras, personal mobile devices, and other similar devices.

According to an embodiment of the present invention, the architecture of CRAVENET 102 includes a plurality of parallel cloud networks. More specifically, CRAVENET 102 includes a plurality of Local CRAVENET Cloud Networks (LCCNs) 202, a plurality of Wide CRAVENET Cloud Networks (WCCNs) 204 and one or more Central CRAVENET Cloud Networks (CCCNs) 206. Each of the plurality of LCCNs 202 interconnects a set of vehicles 108. The vehicles 108 may be equipped with Cognitive Radio (CR) and may communicate and share their collected information about traffic, weather, driver behavior, street views and the like with each other using the LCCNs 202. Each LCCN 202 interconnects the set of vehicles 108 positioned within a pre-defined range of each other. The vehicles 108 in each LCCN 202 are considered as moving local cloud positions. Each LCCN 202 enables sharing of computational resources, data storage resources, spectrum resources as well as other resources associated with each vehicle 108. Each vehicle 108 can retrieve aggregated cloud methods and cloud services using a demand side resource management mode. Demand side management refers to the selective allocation of resources by LCCN 102 based on service requirements of each vehicle 108.

Each of the WCCNs 204 interconnects two or more LCCNs 202 using a short-range communication system. For example, the vehicles 108 may be indirectly communicatively coupled with one or more of the WCCNs 204 via dedicated short-range communications (DSRC) infrastructure, one or more WiFi hotspots, and the like. The one or more vehicles 108 may further be indirectly communicatively coupled with the one or more dedicated LCCN servers (not shown in FIG. 2).

The DSRC infrastructure may include one or more transceivers radio frequency communications, and may operate, e.g., in the DSRC band (5.9 GHz). The DSRC infrastructure may be present along roadways, and may be, for example, included in traffic signs, traffic lights, etc. A communications circuit in the vehicle 108 may include circuitry for dedicated short-range communications, which may be used for communications with other vehicles (V2V), and with the DSRC infrastructure (V21). Further, the DSRC infrastructure may include transceivers for communicating with one or more CCCN 206.

The WiFi hotspot may be used for connecting networked devices such as the one or more vehicles 108 to the WCCN 204. The WiFi hotspot may include a router for WiFi communications (typically 2.4 GHz or 5 GHz bands) and may be operable to receive multiple transmissions substantially simultaneously. For example, the router may receive transmissions from the one or more vehicles 108, and/or, e.g., from one or more mobile devices. Additionally, the hotspot may communicate with the WCCN 204, via, e.g., satellite communications or a cable network. The hotspot may include a transceiver and antenna for satellite communications, e.g., in the Ka band (18.3-30 GHz) or transceiver adapted to cable communications. The hotspot may receive, via the WCCN 204, e.g., Internet protocol (IP) communications from, e.g., the LCCN server. Connecting with a WiFi hotspot takes time and often requires the use of a password. It may be difficult for vehicles 108 to connect with WiFi hotspots while moving. The WiFi hotspots may, however, be included in a communications plan in other ways. Vehicles 108 may connect with a WiFi hotspot when parked, for example in a garage at home or in a public place with a hotspot. The vehicle 108 may, during these times of being stationary, update coverage maps, traffic situations, etc. Additionally, e.g., a user of a vehicle 108 may stop in the vicinity of a hotspot, and connect to the WiFi hotspot via a mobile device. The mobile device may, e.g., download traffic or weather data. The mobile device may then synchronize the data with e.g., a computer in the vehicle 108.

When the vehicle 108 is physically located within a particular geographic region of a corresponding WCCN 204, the vehicle 108 accesses the WCCN 204 by one of the communication methods described above. In other words, a WCCN 204 is a trusted resource rich cloud network that offers a variety of cloud services to bypassing vehicles 108. In an embodiment of the present invention, the WCCN 204 is configured to provide at least one of: system configuration update services, application customization services and shared large data storage services.

According to an embodiment of the present invention, the CRAVENET 102 further includes one or more CCCNs 206 interconnecting two or more WCCNs 204 using a long-range communication system. In one embodiment, the CCCN 206 may be established by interconnecting a group of dedicated WCCN servers (not shown in FIG. 2) via internet. The vehicles 108 may be indirectly communicatively coupled with one or more of the CCCNs 206 via cellular towers, for example.

The cellular tower may be used for radio frequency communications in the ultra-high frequency (UHF) range. Cellular communications frequencies may include, e.g., 850, 900, 1,800 and 1,900 mega Hertz (MHz) frequency bands. The cellular towers may be e.g., communicatively coupled with the one or more vehicles 108 and the WCCN 204. Cellular communications may include both voice and data communications.

In an embodiment of the present invention, the CCCN 106 is configured to implement various policies related to cloud services. Examples of such policies include, but are not limited to, pricing policies (discounts, upcharges, customer specific, partner specific, custom, etc.); traffic alerts based on pre-defined traffic thresholds; and resource allocation policies by allocated and utilized capacity of each vehicle 108.

In various embodiments, the CRAVENET 102 may be implemented using a variety of commercially available software platforms, such as, but not limited to Amazon Web Services, Microsoft Azure, IBM, Google Cloud Platform, Salesforce.com, Adobe, Oracle cloud, SAP, Rackspace and Workday etc. The disclosed CRAVENET architecture 102 enables physical resource utilization in all three layers 202-206 of the CRAVENET 102. Physical resources include but are not limited to cloud servers, a cloud memory, network resources, social networking resources, IoV applications, and the like. At least in some embodiments, the CRAVENET 102 may optimize the allocation of social networking resources.

In one embodiment, the CRAVENET 102 resources can be used to track a certain vehicle using direct or multi-hop methodology on a highway, such as to keep the track of a convoy. The embodiment can include a real-time three dimensional GPS tracking, storage and sharing. For example, the CRAVENET 102 can be used for traffic management analysis in a real-time GPS tracking and share application. This application may provide other than traditional GPS, the real-time interactive three-dimensional map, live streaming of street views, intersection views with an adaptive optimize route to avoid traffic congestion or delays due to accident or construction sites. This allows each vehicle 108 to store the necessary map data and share their trip maps with friends and family members, insurance partners and auto expert engineers on social networking sites.

As noted above, cloud-based services provided by all three layers 202-206 are accessible to all CRAVENET vehicles 108. CRAVENET's cloud-based processing is suited for complex tasks—such as data association. Advantageously, all three layers 202-206 of the CRAVENET 102 may be deployed relatively quickly and easily to facilitate distributive nature of cloud-based services described herein.

Referring back to FIG. 1, the CRAVENET platform 102 is communicatively coupled with the IoV application management system 106. In one embodiment, the IoV management system includes at least one of: a client management system, a gateway management system, a cloud management system, and the like.

The client management system extracts sensor information and analyzes radio frequency (RF) spectrum usage to optimize the allocation of RF spectrum resources. The client management system is a centralized system that is configured to provide wireless communication infrastructure for real-time IoV application connectivity services to the sets of vehicles with the capability for locating desirable cloud-based services in a cost-effective manner. Certain embodiments of the client management system provide an engine for extracting sensor information from a centralized censor database having information relating to different vehicles 108. Generally, it is desirable to integrate into a single client management system as many distributed cloud-based services as possible so that vehicle's service requests can be fulfilled without the vehicle 108 needs to know what layer of CRAVENET 102 is used. According to an embodiment of the present invention, the client management system may provide IoV application connectivity features without the requester vehicle knowing the particulars of a communication network with which the vehicle may be in contact, e.g., the commercial radio service provider (CMRS), the wireless communications protocol, etc.

The gateway management system is configured to provide real-time network access services to the set of vehicles 108. In other words, the gateway management system ensures the real-time performances of the interconnection and the intercommunication of the IoV large-scale heterogeneous network. In particular, the gateway management system provides a variety of interconnection methods, such as, but not limited to, vehicle-to-vehicle, vehicle-to-roadside and vehicle-to-Internet. The gateway management system coordinates global real-time network access to each vehicle 108 in the cloud-enabled CRAVENET 102. The gateway management serves as an enabling platform to build innovative IoV applications.

The cloud management system is configured to provide a plurality of computational and information processing services. In other words, this cloud management system facilitates multiple computational operations and various services including, but not limited to, authentication, logistics, transport, emergency, business, safety features and environment. For example, the cloud management system may be configured to perform various operations and functions related to virtualization, authentication, real-time data collection, operation, scheduling, monitoring, controlling and IoV applications management.

It will be understood that all three layers 202-206 of CRAVENET 102 are configured to serve as an enabling platform to a plurality of IoV applications 110 facilitating enhanced resource management among many other services.

According to an embodiment of the present invention, one of the IoV applications 110 facilitated by the CRAVENET 102 may comprise an Intelligent Disaster Management Reinforcement System (IDMRS). The IDMRS is configured and operable to provide the efficient V2V communication and computational environment for emergency/disaster situations. For example, if the emergency is a natural disaster such as a tornado, then the Emergency Medical Services (EMS) vehicles need reliable and efficient communication to be able to coordinate the evacuation process with each other. If the emergency is a fire or the like, the IDMRS may direct the fire-fighting vehicles to an appropriate exit or the fire-fighting vehicles may be guided to a nearest fire hydrant location outside the building under fire. In some embodiments, the IDMRS may communicate with the building system to appropriately guide the vehicles 108. For example, the IDMRS may receive instructions from the building system regarding a target location to direct the appropriate vehicles 108, which may be based on the type of emergency, certain obstructions that exist (e.g., fallen debris, smoke, or the like), the fastest or most efficient routes of reaching desired location, and/or the like. In other embodiments, the IDMRS may determine how to appropriately guide the vehicles 108 without communicating with the building system.

In one embodiment, the IDMRS may be able to contact local law enforcement and other emergency or security personnel using secure communication platform. Further, emergency alerts can be automatically sent from the cloud-based IDMRS to all vehicles located in the vicinity of the disaster/emergency. In other words, in some embodiments, the various CRAVENET vehicles 108 may be enabled to communicate with one another without active communication with Internet, and data associated with those vehicles may be analyzed, for example, in combination with rules-based inference engines and/or artificial intelligence and/or any suitable smart environment data and/or any suitable rules or settings or inferences or modes that may be supported by the CRAVENET environment 102. The IDMRS provides a low-cost infrastructure solution that merges wireless and wired network devices to facilitate multiple essential services, routing techniques, dynamic spectrum sharing methods, various attack protection, etc., to a plurality of autonomous and/or non-autonomous vehicles 108. Thus, the IDMRS can provide secure essential services and/or support secure communication which can be a predefined structure as with a conventional network or simply an ad hoc communication between at least two vehicles 108.

In one embodiment, the vehicular hybrid network system architecture 100 provides the IDMRS as an application 110 in an urban environment. The deployed IDMRS application model makes the existing disaster management reinforcement system more efficient and process aligned. For example, the IDMRS application may have a capability to deliver the real time information of the road side accident place directly to public safety vehicles and/or law enforcement vehicles through the CRAVENET 102. At least in some cases, the IDMRS may substantially increase the total number of evacuated people from a place of accident. This adaptive, iterative, procedural IDMRS framework can be used in department of transportation (DoT), for example, for efficient management of transport services and policy planning.

Figure 3:
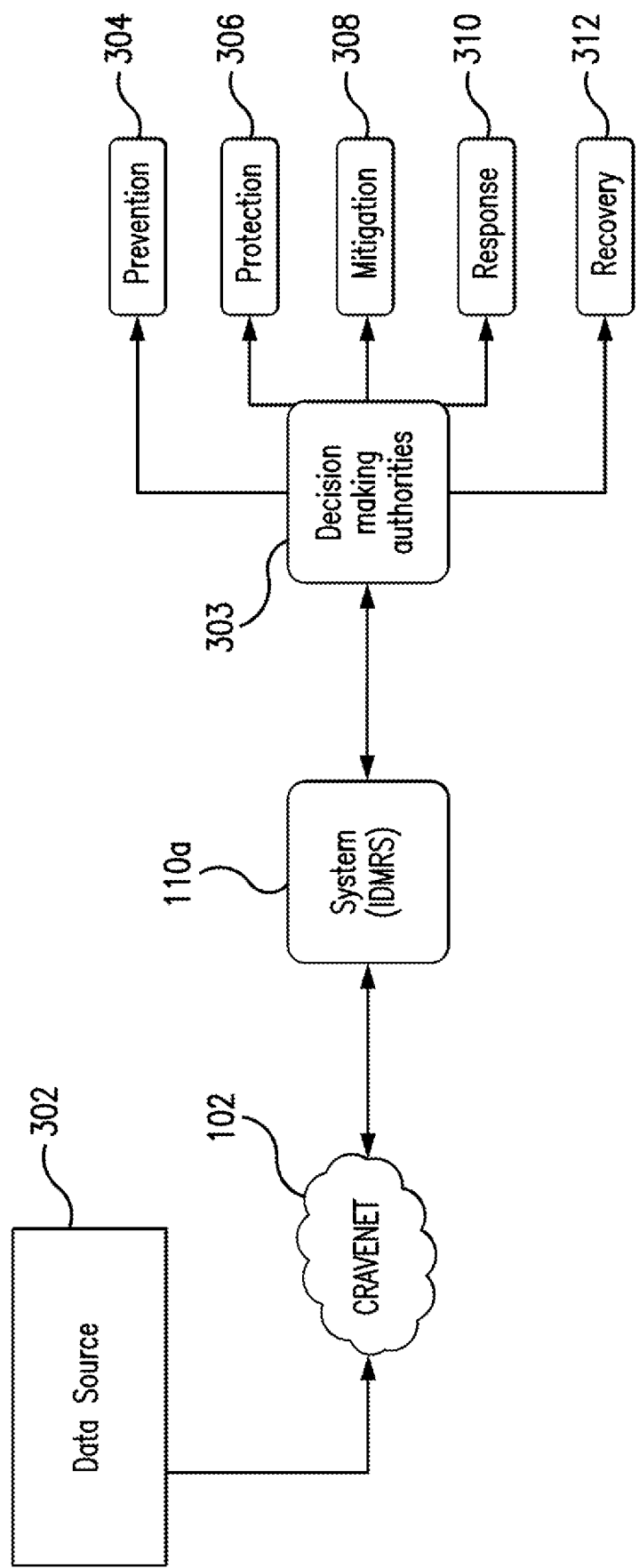
FIG. 3 shows a schematic diagram of an Intelligent Disaster Management Reinforcement System (IDMRS) in accordance with this disclosure.

FIG. 3 shows a schematic diagram of an Intelligent Disaster Management Reinforcement System (IDMRS) in accordance with this disclosure. As shown in FIG. 3, the cloud-enabled CRAVENET platform 102 is operatively connected with one or more data sources 302. In various embodiments the data sources 302 may include but are not limited to, CR equipped vehicles including EMS/Police/Others and state or local government authorities and/or emergency services. In one embodiment, the data source 302 may be configured to provide real-time visual streaming of information and the CRAVENET 102 may be configured to perform real-time visual information collection and analysis of the received information. The CRAVENET 102 may pass the received and/or analyzed information to the IDMRS 110*a*. The IDMRS 110*a* may be configured to support a strategic operational process from a plurality of decision making authorities 303. The IDMRS 110*a* enables the decision makers 303 to operate based on good data and make good decisions and enables them to produce decisions that are consistent with achieving the strategic objectives of the mission as a whole. The decision making authorities may include, but are not limited to, prevention authorities 304, protection authorities 306, mitigation authorities 308, response authorities 310 and recovery authorities 312. The IDMRS 110*a* may be configured to perform real-time visual information collection, analysis and may be configured to share strategy from the decision making authorities 303 for fast and efficient strategy implementation among multiple entities, such as, but not limited to, EMS vehicles, law enforcement vehicles, local and state government authorities and emergency services.

Embodiments can include a bandwidth resource sharing IoV application configured to manage network bandwidth between the set of vehicles based on each vehicle's network bandwidth requirements. This IoV application allows accessing vehicles 108 to share their bandwidth resources as per their requirement in CRAVENET 102. It is difficult to upload/download large volume files and access multimedia applications due to high-speed vehicles and limited wireless bandwidth. If there is large data to be uploaded, the data can be distributed among the CRAVENET layers 202-206 and each node can upload in chunks, and download in a similar manner. Certain security aspects are required to implement such a distributive network.

Embodiments can include a vehicle tracking, storage and sharing (VTSS) IoV application configured to manage vehicle tracking, storage and sharing in real-time and in three dimensions. In one embodiment, resources of the CCCN 106 may be utilized for real-time vehicle tracking and traffic management analysis. In addition to conventional GPS functionality this application may provide either two dimensional (2D) or three dimensional (3D) images of maps and different views, such as, for example, street views and intersection views, depicting an adaptive optimized route to avoid traffic congestion In one embodiment, a vehicle 108 in the LCCN 202 may request the VTSS application from either the WCCN layer 204 and/or the CCCN layer 206. In response to such a request, the traffic analysis process starts in the corresponding layer of CRAVENET 102 for the particular requested route. After the analysis, the CRAVENET 102 suggests several routes based on the actual traffic flow information on or near the suggested routes. At least in some embodiments, the CRAVENET 102 may combine historical and current information about road traffic conditions in order to generate the suggested routes. Once a vehicle selects the route then a corresponding layer of the CRAVENET 102 keeps updating the driver with real-time driving related data. This data can include one or more of traffic, driving behavior, road conditions, weather conditions, or local constructions sites, for example. Any other suitable data is contemplated herein. In some embodiments, the VTSS application may allow each vehicle 108 to store the necessary map and share their particular trip maps with friends and family members, insurance partners and auto expert engineers on social networking sites, for example.

Embodiments can also include a video monitoring, storage and sharing (VMSS) IoV application configured to manage high definition video monitoring, storage and sharing. Typically, a very large volume of a hard disk is needed to store high definition video content of an entire trip. Currently, in the case of an accident, the police department is not able to make timely and proper decisions immediately after an accident because there are no video content available reflective of immediate accident conditions and even if they do exist, typically they cannot be electronically updated, deployed and displayed instantly and in real time. The VMSS addresses these problems by utilizing a distributed storage paradigm. For example, each layer 202-206 of the CRAVENET 102 can include a dedicated storage device or one of the servers can be designated as a distributed storage to store content that is to be distributed. The VMSS application enables any vehicle 108 to monitor, store, retrieve and share their high definition trip videos into the corresponding LCCN 202. In one embodiment, a vehicle 108 in the LCCN 202 may request the VMSS application from either the WCCN layer 204 and/or the CCCN layer 206. In response to such a request, the CCCN layer 206 may start receiving/sending (uploading/downloading) video content originated/targeted from/to the vehicle 108. According to an embodiment of the present invention, the VMSS may separate the received high definition video content into multiple segments and may store those multiple segments along the entire trip in different layers 202-206 of the CRAVENET 102 in a distributed manner. Accordingly, in case of an accident, for example, in some embodiments, to make a proper and immediate decision, the police department vehicle can receive a detailed high definition video content associated with a corresponding trip from different layers 202-206 of the CRAVENET 102 using the VMSS application.

Embodiments can also include a unique vehicle identity (UVI) IoV application configured to provide vehicles administrative authentication for IoV applications access. An UVI combines a vehicle's smart information like on-board point of care diagnostics and shares that information with the CRAVENET 102. In one embodiment, the CRAVENET 102 may divide the geographical communication region covered by the LCCN layer(s) 202 into sub-regions based at least in part on the average number of vehicles in that subregion. The IoV module may be configured to generate UVI information indicative of region information, for example, by using at least in part geo-coordinates of the corresponding CRAVENET vehicle location, such UVI information enables the UVI module to create an interactive location-based map (e.g., vehicles road trip map). In various embodiments the UVI application may provide unique features to avoid identity infringement issues and enhance privacy in private data protection and trusted ID services. The UVI may further enable IoV cloud terminals having man-to-machine interfaces providing connectivity to in vehicle screens (e.g., to determine vehicle operation or get information about specific vehicle features), auto insurance companies, rescue operations, vehicle remote inspection, remote updates, and the like.

According to an embodiment of the present invention, the CRAVENET inter-vehicular communication system 104 supports at least two different modes of communication: CR broadcast mode and a CR bilateral mode. When operating in CR Broadcast mode, the plurality of vehicles 108 in the CRAVENET 102 can exchange information without having an established connection with every other vehicle. In this mode, information is broadcasted over the CRAVENET 102 to the entire plurality of vehicles 108 and unlike the connection-oriented communication it is not important to ensure that the broadcasted information was received by every single vehicle 108. For example, if a traffic accident occurs at a particular location, an anonymous broadcast of the event would be more efficient than full duplex communication between the plurality of vehicles 108. This mode of communication is susceptible to impersonations attack and fabrication attacks. A novel security protocol is designed to address this issue as described below.

According to an embodiment of the present invention, the CR Bilateral mode is a full duplex communication mode that requires established connections between the plurality of vehicles 108 to exchange information. In this mode, in order to establish a connection and prior to exchanging any content, message source and message destination vehicles exchange certain type of information first, such as, but not limited to vehicles' unique identifiers. This mode of communication is susceptible to wormhole attacks, fabrication attacks, impersonation attacks, reply attacks, denial of service attacks, and the like.

According to an embodiment of the present invention, the CRAVENET communication system 104 is configured to provide distributive communication to the plurality of vehicles 108 via a secure communication protocol. The secure communication protocol is designed to protect CRAVENET resources from both internal and external threats, such as, but not limited to, message integrity, active level attack, acknowledgment message attack, message modeling attack, message mutation attack, message voiding attack, service message attack, spectrum demand attack, spectrum supply attack, Denial of service (DoS) attack and Sybil attack. In various embodiments, the disclosed secure communication protocol enhances the privacy of an authentication process in the CRAVENET 102. The CRAVENET secure communication protocol utilizes UVI as a trusted entity and provides multiple real-time channels over which the plurality of vehicles 108 can communicate and interact with each other. The secure communication protocol also guarantees the message integrity by delivering the unaltered messages to one or more recipients in the CRAVENET 102 and enables the vehicles 108 in the CRAVENET 102 privacy and security of a CRAVENET user. According to embodiments of the present invention, in case a malicious act is detected the true identity of a bad actor will be revealed only to the law enforcement agencies. The secure communication protocol facilitates fast identity verification process, virtual storage and other aspects of security for a plurality of the CRAVENET vehicles 108.

Figure 4:
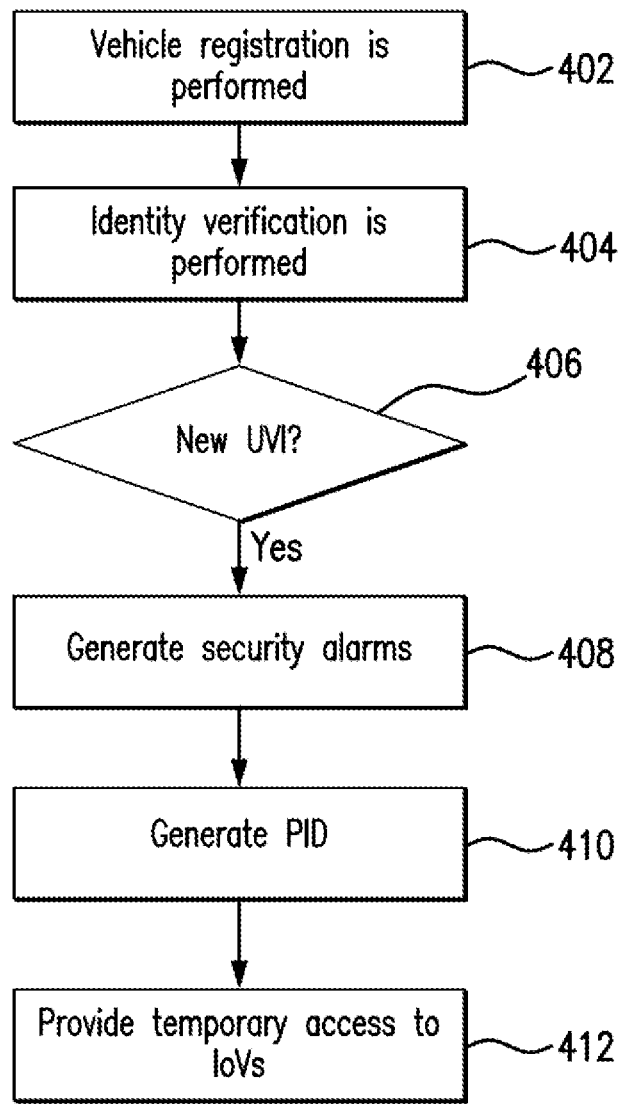
FIG. 4 shows a flow diagram of an embodiment of a distributive vehicle registration method in accordance with this disclosure

FIG. 4 shows a flow diagram of an embodiment of a distributive vehicle registration method in accordance with this disclosure. At step 402, a vehicle 108 registers itself with the CRAVENET. The step 402 may be supporting fast identity verification techniques, including vehicle identity establishment, and related registration. Certified signature information may be used to reliably and explicitly authenticate a CRAVENET vehicle as valid, by for example, checking such vehicle's certified signature information for a match against the corresponding set of certified signatures associated with all CRAVENET vehicles that is maintained by the CRAVENET communication system 104. Once the vehicle registers itself, all other vehicles, in turn, may require the newly registered vehicle to present sufficiently reliable identity ensuring the vehicle is securely communicating with the appropriate CRAVENET service (e.g., UVI module). At step 404, the UVI module (e.g., UVI IoV application) performs identity verification by first checking the vehicle's UVI in the centralized database maintained by the UVI module. At step 406, the UVI module determines if UVI match is found. If a match is not found and the received UVI is a new UVI (decision block 406, yes branch), the UVI module generates security alarms at step 408 such as, for example, an alert message or any suitable sound. In addition, at step 408, the UVI module stores the newly generated security alarm against that particular UVI in a centralized database. The generated alarms can be removed only when corresponding vehicles successfully pass identity verification and enrollment processes. At step 410, the UVI module generates a summary of credential parameters associated with the vehicle. For example, credential parameters associated with a vehicle may include a universal pseudo identity (PID), a limited time stamp, applicable components (e.g., infotainment system), and/or the like. This credential summary gives the vehicle temporary access (e.g., until the limited timestamp expires) to the limited CRAVENET resources (step 412). In one embodiment, the vehicle credential summary may be used for enabling communication among vehicles within the CRAVENET network. In order not to create any serious security and safety risks within the CRAVENET 102, each of plurality of vehicles 108 checks the authenticity of the message received from another vehicle before broadcasting the received message to others.

Through repeated evaluation of these individual vehicle message data, the UVI module may determine a vehicle or a group of vehicles having malicious behavior from within a maximum group of vehicles by comparing the behavior of the relevant vehicle/group with a reference vehicle behavior, for example. When a malicious event occurs, an associated report is generated by the UVI module containing at least PID, UVI and the like. The generated report may be sent to a law enforcement agency, for example. In response to receiving a report associated with the malicious event, the law enforcement agency may send the cancel request (CR) message that may include, for example, the UVI and certified signature information, to the CRAVENET communication system 104, which in turn may block all future messages from the malicious vehicle. According to an embodiment of the present invention, the plurality of CRAVENET vehicles, including the malicious one may continue to exchange messages with each other until the law enforcement agency sends the CR message to cancel malicious vehicle's UVI and certified signature.

Figure 5:
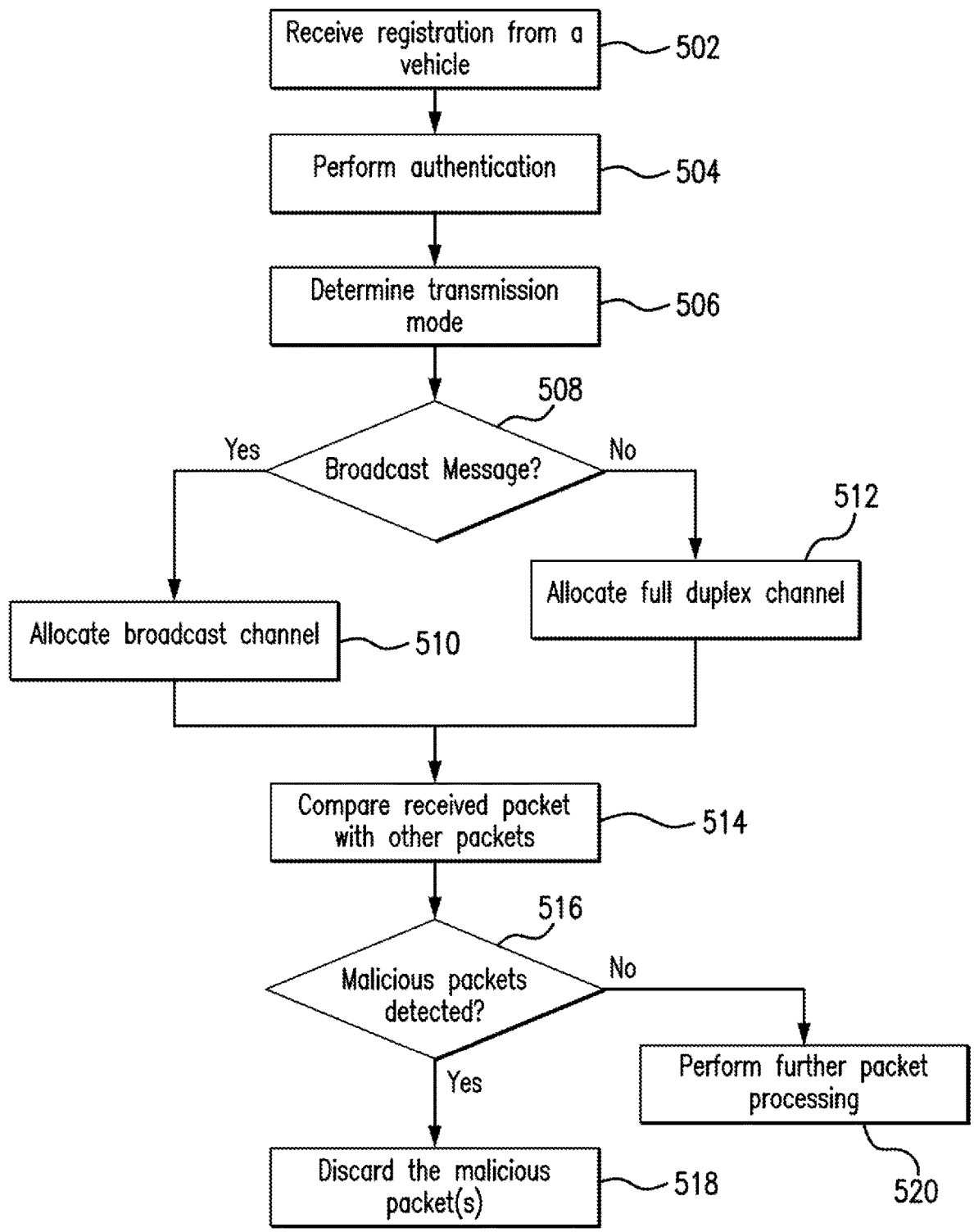
FIG. 5 shows a flow diagram of an embodiment of a distributive security method in accordance with this disclosure.

FIG. 5 shows a flow diagram of an embodiment of a distributive security method in accordance with this disclosure. The disclosed security method addresses aforementioned security threats and ensures the confidentiality, integrity and availability of vehicles and their data. Optionally, the disclosed security method may also encrypt at least a portion of the exchanged data for added security. At step 502, a vehicle 108 registers itself with the CRAVENET 102, as discussed above.

According to an embodiment of the present invention, at step 504, vehicle authentication is performed. In some embodiments, cross authentication of the vehicle being registered is required both from the CRAVENET 102 and the entire cloud. Next, at step 506, the CRAVENET communication system 104 determines an appropriate transmission mode, such as, CR broadcast mode or CR bilateral mode. As noted above, when operating in CR Broadcast mode, the plurality of vehicles 108 in the CRAVENET 102 can exchange information without having an established connection with every other vehicle. In this mode, information is broadcasted over the CRAVENET 102 to the entire plurality of vehicles 108. For example, an anonymous broadcast may be used to inform all other vehicles that a traffic accident occurred at a particular location. Broadcasted message may be triggered by a plurality of other internal or external events detected by a particular vehicle.

In response to determining that newly registered vehicle needs to broadcast a message (decision block 508, "Yes" branch), at step 510, the CRAVENET communication system 104 allocates a broadcast channel. In various embodiments, broadcast channels may include a primary broadcast channel and/or a dynamic broadcast channel, for example. The primary broadcast channel is transmitted using a fixed transmission method as in the case of a broadcast channel in W-CDMA, for example. The primary broadcast channel is used to report minimum basic information. The dynamic broadcast channel is used to report information other than the information reported by the primary broadcast channel. The dynamic broadcast channel is transmitted via a shared data channel. A channel shared by multiple vehicles is generally called a shared channel.

In response to determining that newly registered vehicle needs to transmit a message in CR Bilateral mode (decision block 508, "No" branch), at step 512, the CRAVENET allocates a full duplex channel. In various embodiments, step 512 may further involve a full duplex related capability negotiation process between the CRAVENET vehicles. Full duplex mode of operation is used for long-term communications and for connection-oriented communications At step 514, the CRAVENET communication system 104 compares the packets received from the newly registered vehicle with packets received from other vehicles in the same vicinity to detect one or more malicious packet(s). For example, the CRAVENET communication system 104 may compare packets transmitted from vehicles within the same LCCNs 202. It should be noted that the reliability of the comparison algorithm increases proportionally to an increase in the number of processed packets. Malicious packets may be detected, for example, by analyzing unusual traffic patterns and/or by detecting losses of transmitted processed packets. If some of the processed packets are malicious and are being transmitted by an unauthorized vehicle (decision block 516, "yes" branch), at step 518, the CRAVENET communication system 104 discards the malicious packet(s). In addition, at step 518, the CRAVENET communication system 104 may record information related to the discarded packet (including information about the sender vehicle) in a distributive temporary on-board record database (TODS), for example. In various embodiments, utilization of the distributive TODS may generally increase the speed of both lookup and comparison operations.

In response to not detecting any malicious packets (decision block 516, "no" branch), at step 520, the CRAVENET communication system 104 may perform additional packet processing prior to transmitting the received packets.

It is appreciated by those having ordinary skill in the art that any suitable method, system, and/or apparatus may be embodied in any suitable computer hardware and/or software as appreciated by those having ordinary skill in the art. The functions of each embodiment and component thereof (e.g., how data is input, transmitted, received, processed, output, etc.) for each embodiment of a system, method, and apparatus is appreciated by those having ordinary skill in the art in view of the disclosure and the described functions of each portion of the embodiments, and one having ordinary skill in the art appreciates that such portions of this disclosure are enabling.

It should be noted that all or a part of the steps according to the embodiments of the present disclosure is implemented by hardware or a program instructing relevant hardware. Yet another aspect of the invention provides a non-transitory computer readable storage medium which stores computer executable instructions or program codes. The computer executable instructions or program codes enable a computer or a similar computing apparatus to complete various operations in the above disclosed method for efficiently utilizing wireless communications spectrum. The storage medium includes, but not limited to, a magnetic disk, an optical disk, a read-only memory (ROM), a random access memory (RAM), flash drive, or the likes.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

While there has been shown several and alternate embodiments of the present invention, it is to be understood that certain changes can be made as would be known to one skilled in the art without departing from the underlying scope of the invention as is discussed and set forth above and below including claims and drawings. Furthermore, the embodiments described above and claims set forth below are only intended to illustrate the principles of the present invention and are not intended to limit the scope of the invention to the disclosed elements.

References, which may include patents, patent applications and various publications, may be cited and discussed in this disclosure. The citation and/or discussion of such references is provided merely to clarify the description of the present invention and is not an admission that any such reference is "prior art" to the invention described herein. All references cited and discussed in this disclosure, are incorporated herein by reference in their entireties and to the same extent as if each reference was individually incorporated by reference.

What is claimed is:

1. A vehicular hybrid network system, comprising:
   a cloud-based cognitive radio ad hoc vehicular network (CRAVENET) configured to provide information services to a plurality of vehicles in the CRAVENET, the CRAVENET comprising:
   a first plurality of cloud networks, wherein each of the first plurality of cloud networks interconnects a set of vehicles and wherein the set of vehicles shares a set of resources associated with a corresponding cloud network;
   a second plurality of cloud networks, wherein each of the second plurality of cloud networks interconnects two or more of the first plurality of cloud networks using a short-range communication system; and
   one or more central cloud network interconnecting the second plurality of cloud networks using a long-range communication system;
   an Internet of Vehicles (IoV) application management system configured to control the set of resources available to the CRAVENET; and
   a CRAVENET communication system configured to provide distributive communication to the sets of vehicles via a secure communication protocol.

2. The system of claim 1, wherein the first plurality of cloud networks comprises a local CRAVENET cloud-based network interconnecting the set of vehicles positioned within a pre-defined range of each other.

3. The system of claim 1, wherein the second plurality of cloud networks is configured to provide at least one of system configuration update services, application customization services and shared data storage services.

4. The system of claim 1, wherein the one or more central cloud network is configured to implement one or more global resource utilization policies.

5. The system of claim 1, wherein the IoV application management system comprises at least one of: a client management system configured to provide real-time IoV application connectivity services to the sets of vehicles, a gateway management system configured to provide real-time network access services to the sets of vehicles and a cloud management system configured to provide a plurality of computational and information processing services to the sets of vehicles.

6. The system of claim 5, wherein the IoV application management system is configured to provide one or more IoV applications.

7. The system of claim 6, wherein the one or more IoV applications includes an intelligent disaster management reinforcement system configured to provide cloud-based secure communication and computational environment to be shared between a plurality of emergency response entities.

8. The system of claim 6, wherein the one or more IoV applications includes a bandwidth resource sharing application configured to manage network bandwidth between vehicles comprising the set of vehicles based on vehicles' network bandwidth requirements.

9. The system of claim 1, wherein the CRAVENET communication system supports at least: CR broadcast mode that provides connectionless information exchange between the set of vehicles and a CR bilateral mode that provides a full duplex connection between the set of the vehicles.

10. The system of claim 1, wherein each vehicle in the set of vehicles is equipped with or communicatively coupled with a plurality of sensors configured to obtain vehicle-related information and configured to transmit the obtained vehicle-related information to the CRAVENET.

11. The system of claim 7, wherein the intelligent disaster management reinforcement system is configured to communicate with one or more building systems.

12. The system of claim 2, wherein the local CRAVENET cloud-based network is configured to allocate shared resources to the set of vehicles using a demand side resource management mode.

13. The system of claim 6, wherein the one or more IoV applications includes a video sharing application configured to manage high definition video monitoring, storage and sharing.

14. The system of claim 6, wherein the one or more IoV applications includes a Unique Vehicle Identity (UVI) application configured to generate vehicle's UVI information indicative of vehicle's geographic position.

15. The system of claim 1, wherein each of the second plurality of cloud networks interconnects two or more of the first plurality of cloud networks using a dedicated short-range communications infrastructure.

16. The system of claim 1, wherein the one or more central cloud network interconnects the second plurality of cloud networks using radio frequency communications in an ultra high frequency (UHF) range.

* * * * *